US009489867B2

(12) United States Patent  (10) Patent No.: US 9,489,867 B2
Carter et al.  (45) Date of Patent: Nov. 8, 2016

(54) COMPONENT SIMULATION SHELL AND SHIPPING CONTAINER ASSEMBLY HAVING A COMPONENT SIMULATION SHELL

(71) Applicant: Methode Electronics, Inc., Chicago, IL (US)

(72) Inventors: Michael R. Carter, McKinney, TX (US); David E. Hildreth, Flower Mound, TX (US); Tyler M. Miller, Lewisville, TX (US)

(73) Assignee: Methode Electronics, Inc., Chicago, IL (US)

( * ) Notice: Subject to any disclaimer, the term of this patent is extended or adjusted under 35 U.S.C. 154(b) by 757 days.

(21) Appl. No.: 13/841,386

(22) Filed: Mar. 15, 2013

(65) Prior Publication Data

US 2014/0259650 A1  Sep. 18, 2014

(51) Int. Cl.
*G09B 9/00* (2006.01)
*H01R 43/26* (2006.01)
*G09B 23/18* (2006.01)

(52) U.S. Cl.
CPC ........ *G09B 23/182* (2013.01); *Y10T 29/49117* (2015.01)

(58) Field of Classification Search
CPC ...... B65D 5/22; B65D 5/5021; B65D 5/503; B65D 81/133; H05K 13/0084; H05K 13/0417; H05K 13/0421; G09B 23/181–23/182
USPC ........ 206/583, 701–702, 706, 725–728, 443, 206/486; 211/26, 26.2, 70.1; 434/224
See application file for complete search history.

(56) References Cited

U.S. PATENT DOCUMENTS

| 2,593,042 | A | * | 4/1952 | Lynskey | A63B 57/0031 131/256 |
| 3,092,245 | A | * | 6/1963 | Poisson | B65D 5/0245 206/723 |
| 3,466,762 | A | * | 9/1969 | Kirk | B42D 1/08 281/3.1 |
| 3,682,597 | A | * | 8/1972 | Husch | G01N 33/03 206/446 |
| 4,434,890 | A | * | 3/1984 | Sieck | B65D 5/5038 206/443 |
| 4,606,725 | A | * | 8/1986 | Chio | G09B 23/186 434/224 |
| 7,588,373 | B1 | | 9/2009 | Sato et al. | |
| 8,391,663 | B2 | | 3/2013 | Carter et al. | |
| 2005/0145522 | A1 | | 7/2005 | Bloodworth et al. | |

\* cited by examiner

*Primary Examiner* — Chun Cheung

(57) ABSTRACT

The invention provides for a shell having four sides including a front side and a front side having contact points to simulate a host component where the number of contact points and spacing between the contact points on the front side of the shell simulate the number and spacing of receptacles located on the host component so that the shell may be temporarily populated with accessories and the accessories capable of being serially removed and serially attached to the receptacles of the host component. The shell may be carried in a shipment container along with the accessories for shipping to the location of the host component. The accessories may include cable harnesses and have fiber optic connectors temporarily mounted to the component simulation shell during shipping and upon arrival at the host component, the connectors may be removed in a one-to-one matching sequence between the component simulation shell and the host component where the connectors are finally mated.

14 Claims, 8 Drawing Sheets

COMPONENT SIMULATION SHELL AND SHIPPING CONTAINER ASSEMBLY HAVING A COMPONENT SIMULATION SHELL

The present invention relates to a component simulation shell for management of accessories such as cables and provides for an efficient system for attaching and routing cables to components and a shipping container in which a component simulation shell may be mounted.

BACKGROUND

Data centers have become very densely populated spaces where multiple components such as switches, routers, directors or servers are interconnected by a multitude of cables. These hardware components are typically mounted on racks so that multiple components may be interconnected using short lengths of cables. Such cables may be fiber optic cables including cable harnesses. Longer jumper cables or trunk cables (multiple fibers enclosed under one jacket) are used for interconnecting equipment within a data center room or to other equipment in a local area network (LAN).

A rack may be used to mount a hardware component described as a blade; due to the small size (thin profile) and high density of the component. For example, a Brocade Fiber Channel Switch or Ethernet or Ethernet/Network switch or CISCO Fiber Channel or Ethernet/Network Switch backbone component provides an 8 to 100 Gbps network switching platform for a data center storage area network (SAN) or telecommunications system; including as many as 864 fiber channel ports by combining up to 13 "blades," containing 12-, 16-, 18-, 24-, 32-, 48-, or 64-port fiber channel blades in a single rack chassis.

Such hardware blade components are interconnected by fiber optic cables including terminations at the ends of the cables with fiber optic connectors. For example, individually channeled fiber connectors may be LC type connectors, such as LC Pro-Slide or mSFP-LC-Pro-Slide connectors as described in U.S. Pat. No. 7,588,373. A typical fiber-optic cable harness has multiple individually channeled fiber connectors furcated at a first end and a single cable at a second end terminated by a multi-fiber connector, such as an MTP® connector.

A typical means for attaching cables to a rack involves sorting individually bagged jumpers, uncoiling them and dressing them into place with the intent of providing a well organized connectivity infrastructure. When done properly, this process is very time consuming, up to 1 hour per blade. Even when cables are shipped on spools, their removal can be difficult and result in an unmanaged process. They are difficult to tell apart unless there is some management system. Although dividers may be used in the container to attempt to contain the cables, this organizing means is usually unsuccessful and the cables may slip past a divider. Bends in the cables may damage or break the fiber inside the cables and affect the transmission characteristics and the efficiency of the cables. Without a specific cable management system, during shipment and installation once the cables arrive at a data center, the installation may be difficult and extremely time consuming.

Thus, a cost effective system for managing and organization of cables during shipment and installation to hardware components is desired to overcome the above problems with previously known systems.

SUMMARY

The present invention provides for a component simulation shell (CSS) comprising a shell having four sides including a front side and the front side having contact points arranged to simulate a host component wherein the number of contact points and spacing between the contact points on the front side of the shell simulate the number and spacing of receptacles located on the host component so that the shell may be temporarily populated with accessories and the accessories can be serially removed and serially attached to the receptacles of the host component. In an embodiment, the shell may include a hook for suspending the shell from the rack of an adjacent host component. In an embodiment, the shell may be made of paper material, including one of cardboard, paperboard and paper composite material. In an embodiment, the shell may be arranged within an assembly that provides for a retention area adjacent the shell for temporary storing accessory.

In an embodiment, the accessory comprises a cable harness including furcated end portions each having fiber optic connectors cable of being temporarily mounted to the contact points of the shell and the connectors easily removed from the contact points for mating with the host component. In an embodiment, the contact points are rectangular apertures punched-in the front side of the shell and each aperture having a profile that is similarly sized to an outer profile of the connector so that the aperture provides a friction fit to maintain the connector within the aperture and attached to the shell. In an embodiment, the number of contact points provided by the shell is equal to or greater than the number of receptacles of the standard host component so that the CSS may be used to manage and transport accessories for non-standard host components having additional receptacles to be populated by the host component including one of a 64, 48, 32, 24, 18, 12 port format.

An alternative form of the invention includes a shipping container assembly comprising a housing forming a retention area, a component simulation shell (CSS) disposed within the housing and the CSS having contact points arranged to simulate a host component and an accessory disposed in the retention area and connected to the contact points of the CSS in a manner that simulates the arrangement of the accessory when connected to the host component that is simulated by the CSS. In an embodiment, the accessory is a cable harness having connectors attached at ends of the cable and connectors being connected to the contact points of the CSS. In an embodiment, the contact points of the host component comprise a plurality of apertures that simulate fiber optic receptacles of an electronic component. In an embodiment, the electronic component is a horizontally or vertically oriented blade mounted in a rack and the CSS may be removed from the container and located adjacent the rack and serially removing the connectors from the CSS and attaching the connectors to the receptacles of the blade in a serial fashion.

In an embodiment, a first retention area and second retention area are provided and the cable harness includes a first-end portion and a second-end portion, and the first-end portion substantially residing in the first retention area and the second-end portion substantially residing in the second retention area. In an embodiment, the first retention area comprises a front portion of the container adjacent the contact points on the CSS and the second retention area comprises a back portion of the container behind the CSS. In an embodiment, the CSS includes a cable feature for receiving the cable harness therethrough so that a continuous strand of the cable harness may extend from the first retention area through the cable feature and into the second retention area. In an embodiment, the first end portion of the cable harness is furcated and includes an LC type Pro-Slide fiber optic connector. In an embodiment, the second end of the cable harness includes a fiber optic connector having a multi-fiber ferrule including one of an MT style and MTP connector.

A further embodiment of the invention includes a method of managing a cable harness comprising the steps of providing a container having a cable retention area and a component simulation shell (CSS) and the CSS having contact points arranged in an order to simulate an arrangement of receptacles of a host component, attaching connectors of the cable harness to the CSS contact points, arranging the cable harness within the cable retention area, removing the CSS from the container with the cable harness attached and removing and connecting each connector according to the arrangement of the host component so that each connector is mated to the most component using a one-to-one matching sequence between the contact points of the CSS and the receptacles of the host component. In an embodiment, a one-to-one sequence comprised as having each labeled contact point of the CSS providing a one-to-one correspondence with each receptacle of the host component with respect to location and labeling of the CSS. In an embodiment, a boot of each connector includes a first group of alpha numeric indicia, each point of contact on the CSS having a second group of alpha numeric indicia located adjacent each contact point and the host component having a third group of alpha numeric indicia located correspondingly to the first and second alpha numeric indicia so that connectors being removed from the CSS can be populated on the host component whereby installation error is reduced, speed of assembly is increased and cables are maintained in an organized and untangled manner during installation. In an embodiment, the managing process includes the step of hanging the CSS by a hook on a rack adjacent the host component.

BRIEF DESCRIPTION OF THE DRAWINGS

For a better understanding of the subject invention, reference may be had to the embodiments shown in the attached drawings in which.

DETAILED DESCRIPTION

Figure 1:
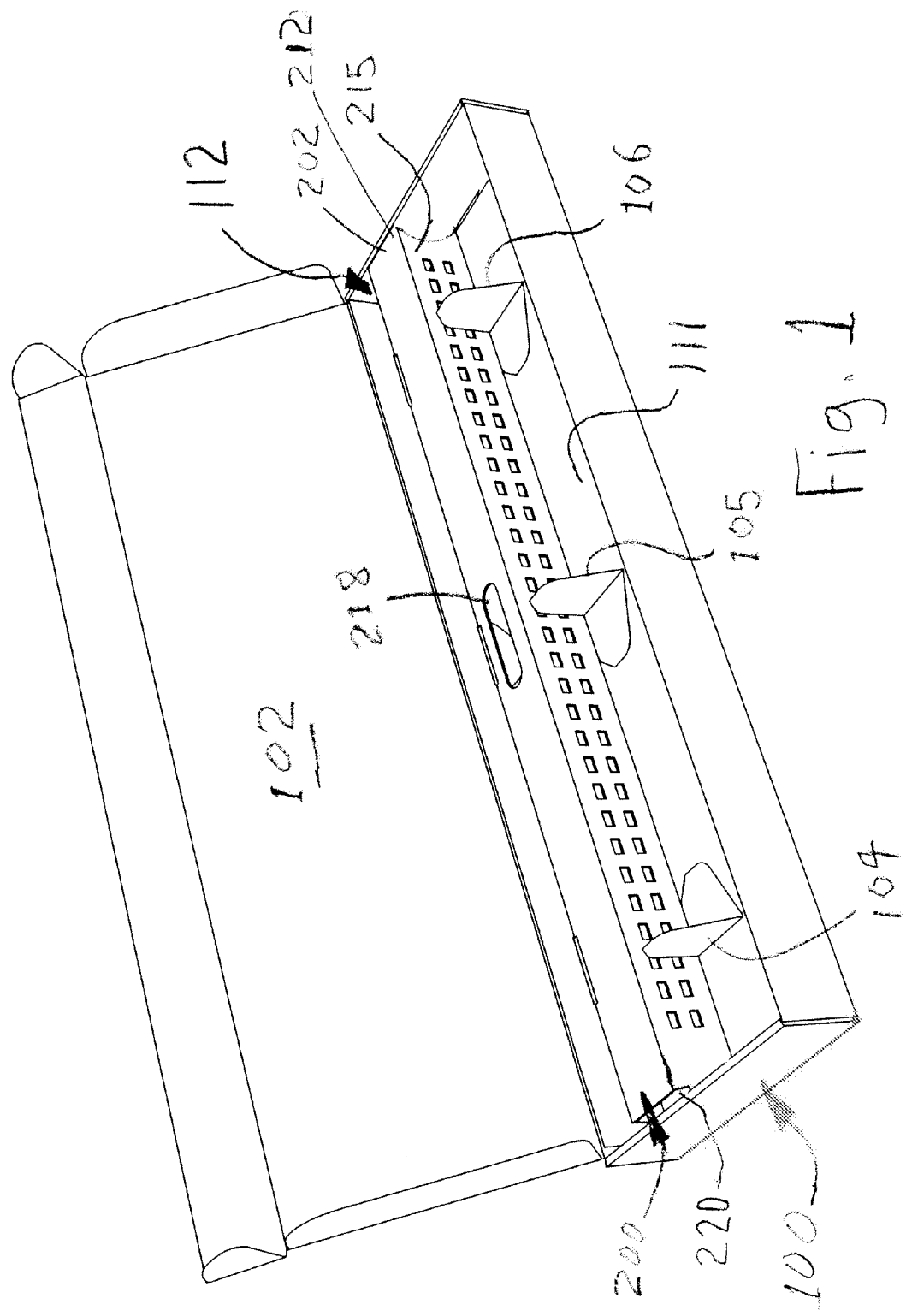
FIG. 1 is a perspective view of the shipping container assembly of the present invention.
Figure 2:
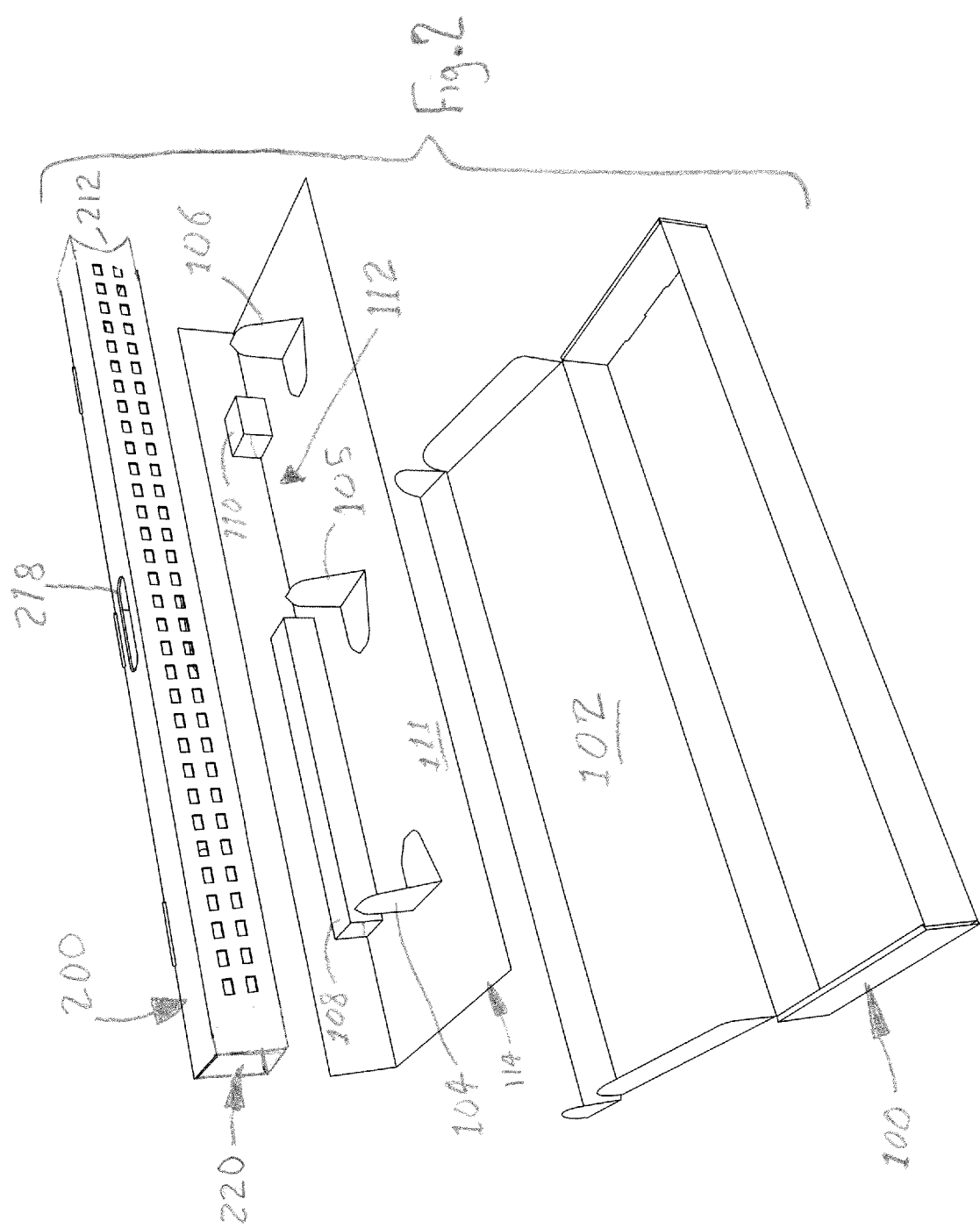
FIG. 2 is an exploded perspective view of the shipping container assembly of FIG. 1.

An embodiment of the invention will be described with respects to FIG. 1-8. With respect to FIGS. 1 and 2, the shipping container 100 includes a lid 102 and four sidewalls forming the sides of the container. In an embodiment, the container may be formed from a paper material such as cardboard or hardboard, and is folded as is known in the art so that it maintains a rigid structure. The lid 102 may be flipped over to enclose the interior of the container in a secure fashion. Braces 104, 105, 106 are provided alongside cable retainers 108, 110; each of which are mounted on a retention area 111, 112 provided by an insert panel 114 (FIG. 2). The insert panel 114 is inserted within the container 100 and as shown in FIG. 1 is disposed along the bottom of the container 100. The first retention area 111 is adjacent to the front of the container 100 and the second retention area 112 is located towards the back of the container 100.

A component simulation shell (CSS) 200 is mounted on the insert panel 114. The CSS is a shell that simulates an electronic component or other component of a host device. The arrangement of the parts of the shell, such as its contact points simulate the arrangement of such contact points of the component. Use of the CSS for shipping accessories, such as cable harnesses provides an easy to use system to keep the accessories in order during shipment and upon arrival at the destination where the host device resides, the accessories may be easily removed from the CSS and installed to the host device.

The CSS as shown in FIGS. 1 and 2 is mounted between the braces 104, 105, 106 and the retainers 108, 110. The braces 104, 105, 106 maintain the CSS 200 in a location towards the rear of the box so that the first retention area 111 remains open and available for the depositing of accessories such as cable assemblies therein. The CSS 200 includes three sides 202, 204 and 206, and also includes a front side 215. On side 202 an oval shaped handle 218 is stamped out from the paper material. Removal of the CSS 200 from the container 100 may be easily undertaken using the handle 218.

The purpose of the container 100 is to provide for the shipment of accessories residing within the container and attached to the CSS 200. Once the container 100 reaches its destination point, the accessories may be easily removed and managed in an orderly fashion by removal of the CSS 200 while the accessories are still attached thereto. In an embodiment, the accessories are cable harnesses. Such cable harnesses may be fiber optic cables or copper cables. However, it is to be understood that other accessories may be transported using the shipping container assembly 100 of the present invention such as connectors that have no cables attached, transceiver modules, other types of electronic accessories and components.

Figure 3:
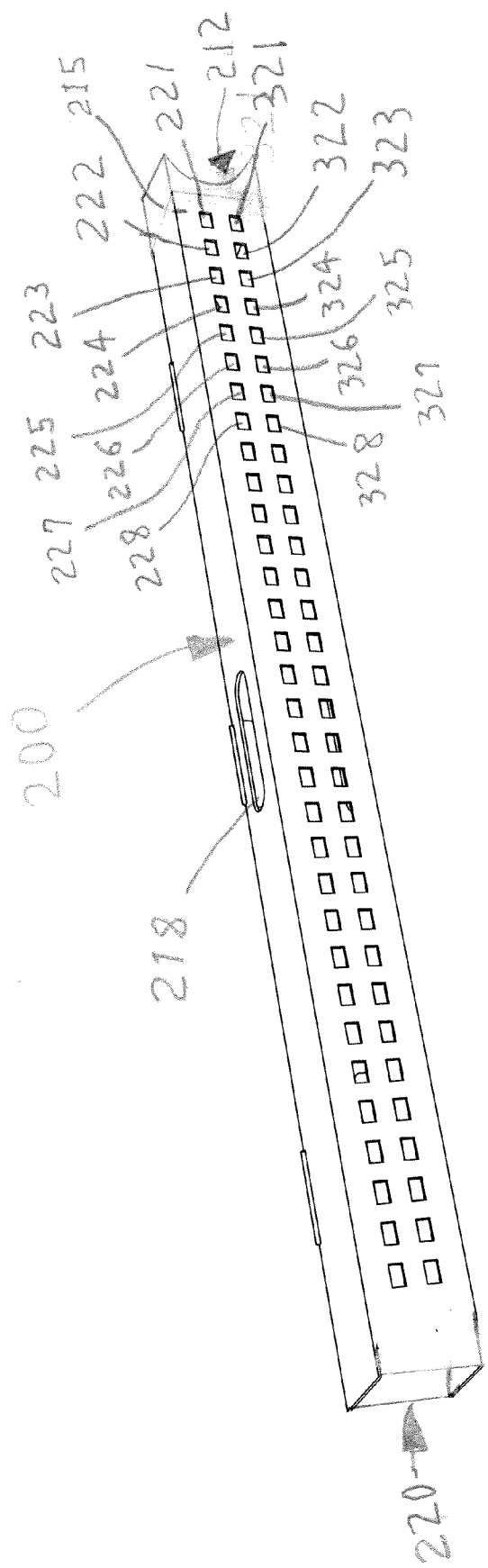
FIG. 3 is a perspective view of a component simulation shell of the present invention depicted in FIG. 1 and FIG. 2.

Turning to FIG. 3 a detailed description of the CSS 200 for carrying and managing cable harness assemblies will be provided. An end of the CSS 200 includes a cable feature 212 through which cables may run without being impeded by the structure of the CSS 200. At an end opposite the cable feature 212 is first end or starting point 220. Contact points 221-228 are depicted on the top row of the front side 215 of the CSS 200. Contact points 321-328 are depicted on the bottom row at the front side 215. The first contact point 221 of the top row is located to the far left adjacent the starting point 212 or first end of the CSS. Moving sequentially across the front side are second, third, fourth, fifth, sixth, seventh and eighth contact points 222-228, respectively. Likewise, first contact point 321 of the bottom row is located adjacent the first end or starting point 212. The contact points of the bottom row are arranged sequentially staring at the first contact point 321 and follow as second, third, fourth, fifth, sixth, seventh and eighth contact points 322-328, respectively.

For the sake of brevity and clarity, the illustration in FIG. 3 depicts only the first eight contact points in the upper row and lower row of the CSS. However, it is to be understood that there are a total of thirty-two contact points extending from the first contact point 221 of the top row towards the end of the CSS adjacent the cable feature 220. Likewise, the bottom row also extends from a first contact point 321 to the opposite end where the thirty-second contact point is located. In an embodiment, each of the contact points 221-228 and 321-328 include ports for receiving connectors attached to cables.

The CSS 200 may be removed from the shipping container 100 via the use of the handle 218 in order to populate the open ports of the CSS with connectors of cable harnesses. When the CSS is fully populated, it may then be returned to the container 100 and the cables arranged properly within the retention area 111.

In an alternate embodiment, the CSS 200 may remain within the container and while mounted therein, the cable harnesses may be populated on the CSS by connecting each of the connectors of the cable harness to the contact points 221-228 and 321-328 of the CSS. The cables that extend from the connectors are received in the first retention area 111, extend from the top end 220 of the CSS downward toward the cable feature 212 and extend through the feature 212 to the rear of the container 100 into the second retention area 112.

Cable retainers 108, 110 (FIG. 2) are configured to receive the ends of the cable harness to help stabilize the cables during shipment. For example, the end of the cable harness may include a multi-fiber connector which is inserted through the cable retainer 110, so that the connectors are not damaged during shipment. The cable retainer 108 is generally a rectangular shaped box and provides some shock absorption for the connectors, so that the ferrules do not become damaged during shipment. The cable retainer portion 108 is more elongate in an embodiment than the cable retainer portion 110. In an embodiment, the furcated portions of the cables that may have tape splicing or other furcation materials can be received within the cable retainer portion 110 to prevent damage to those exposed areas.

Figure 4:
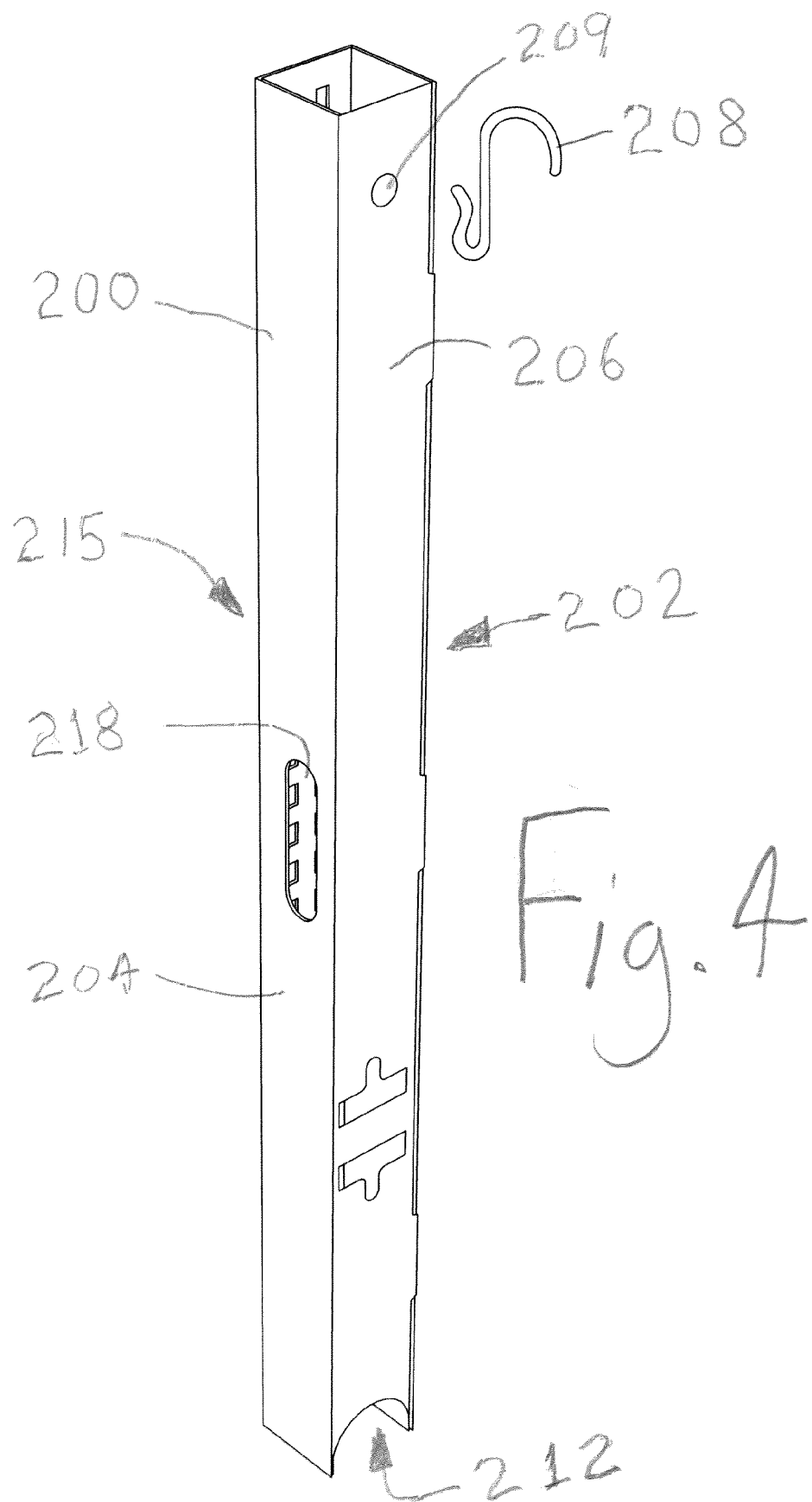
FIG. 4 is a perspective view of the component simulation shell of FIG. 3 in a vertical orientation.
Figure 8:
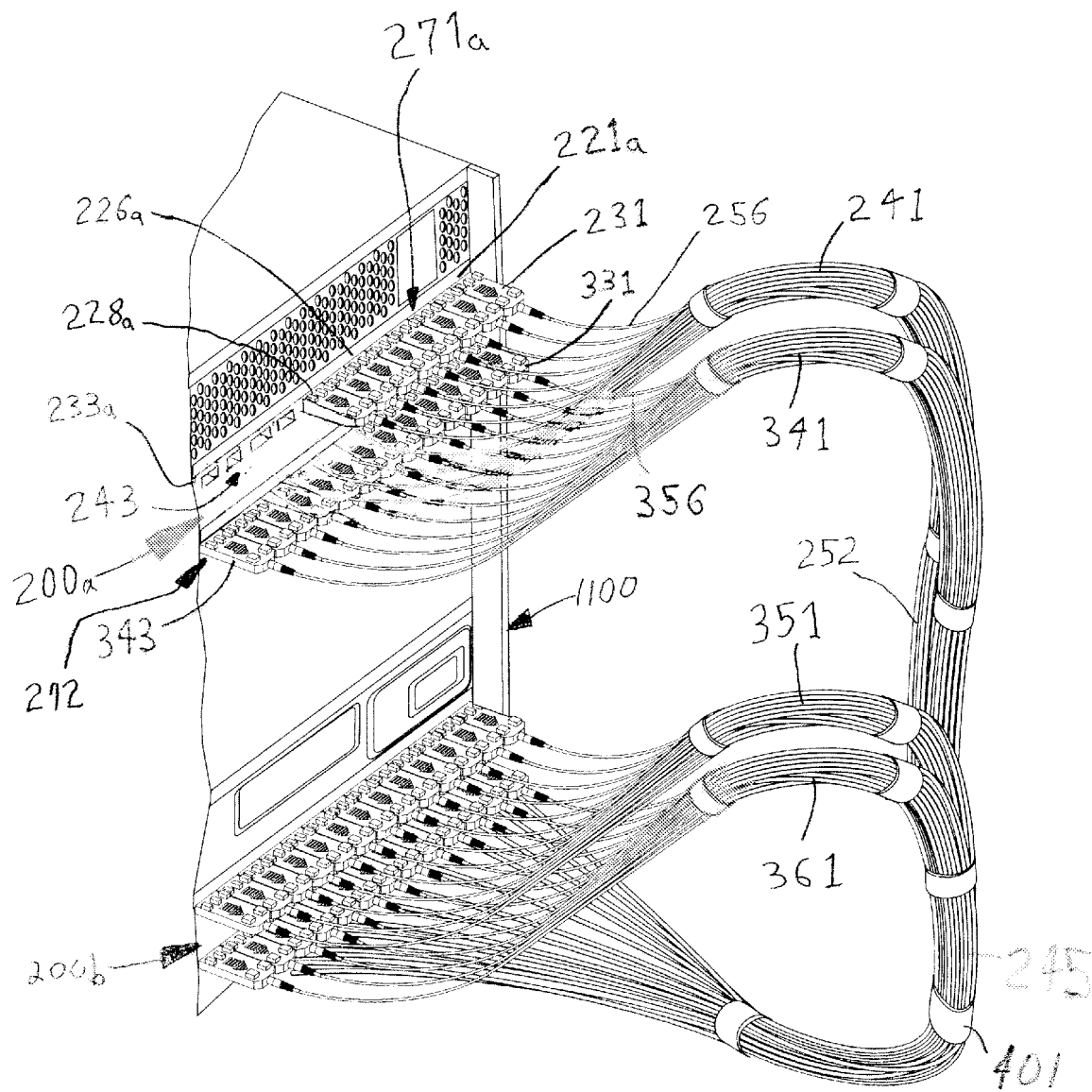
FIG. 8 is a perspective view of a rack system depicting multiple cable harnesses following their removal from component simulation shells and neatly arranged on the blades and electronic components of the rack.

Turning to FIG. 4 the CSS 200 is depicted in a vertical orientation. The handle 218 may be used to remove the CSS from the container 100 (in order to relocate the accessories attached to the CSS (not shown)), and to orient the CSS in a vertical orientation. For example, the backside 206 of the CSS has a hole 209 for receiving hook 208. The hook 208 may be used to mount the CSS 200 to a rack in a data center. Mounted in the rack are electronic components such as blades (FIG. 8). For example, a Brocade fiber channel or Ethernet/network switch or Cisco fiber channel or Ethernet/network switch backbone component may be the preferred host device (blade) mounted in the rack.

In order to complete the assembly of the blades with the cable harnesses, a technician must manage and organize the cable harnesses, so that they may be placed in the proper location on each blade and each cable harness is managed in a neat and organized fashion. By locating the CSS directly nearby the blades to which the cable harnesses must be connected allows for the technician to act efficiently in a one-to-one matching sequence for removal of the cable harnesses from the CSS and attaching the cable harnesses to the blades. Following removal of the cable harnesses from the CSS and fully populating the electronic component or blades of the rack, the CSS may be unhooked from the rack and either sent back to the manufacturer or discarded.

Figure 5:
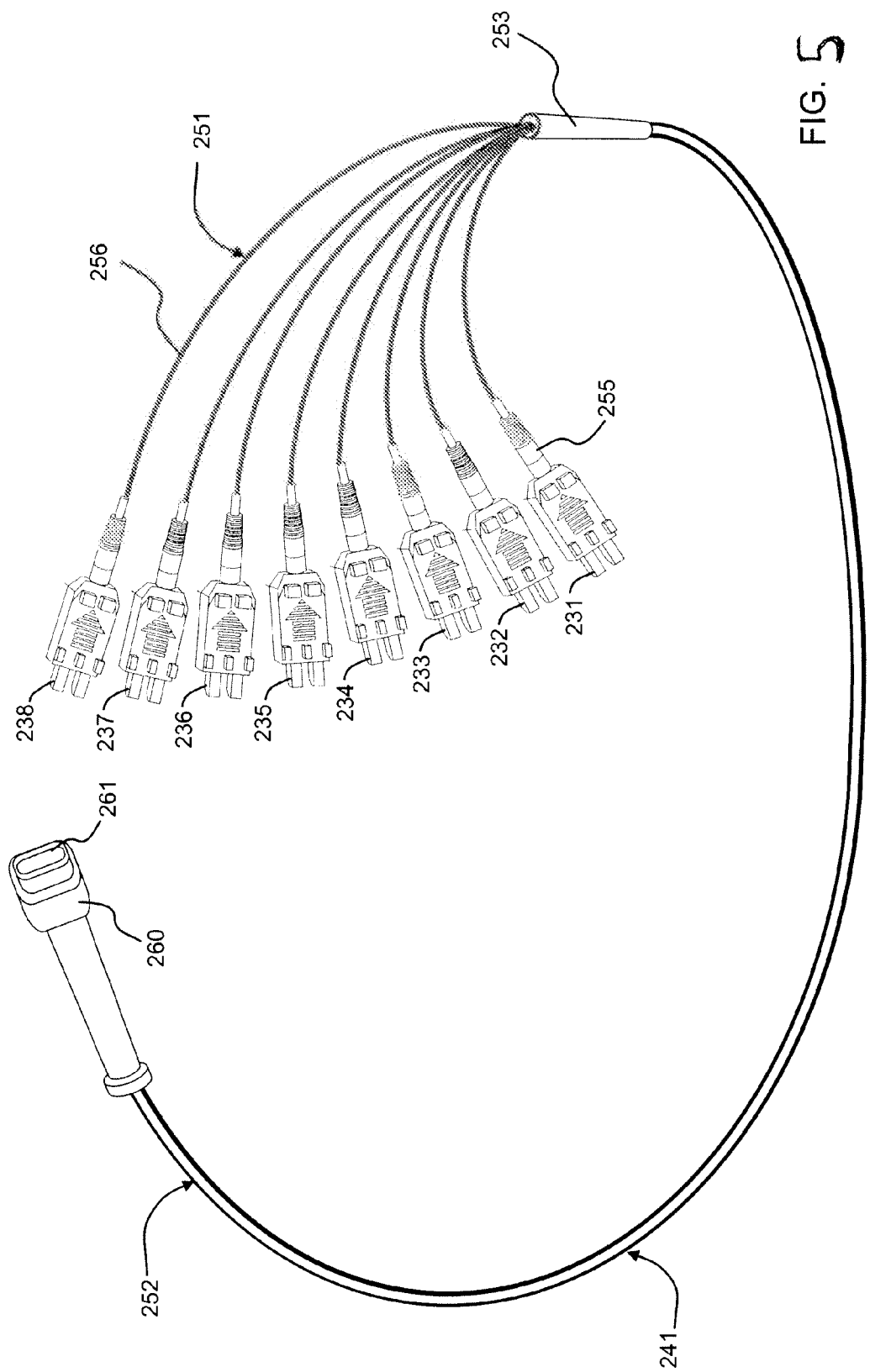
FIG. 5 is a perspective view of a cable harness that may be attached to the component simulation shell of the present invention.

FIG. 5 depicts an example of a typical cable harness. The harness 241 has a first end 251 including individual fiber cables 256 attached to each of the eight fiber optic connectors 231-238 and a second end 252 to which a multi-fiber connector 260 is attached. In an embodiment, a multi-fiber connector 260 may be used such as an MTP connector. Such connectors include a ferrule 261 which can accommodate up to twenty-four optical fibers. In the cable harness 241, it is to be understood that the eight (duplex) optical connectors 231-238 are terminated with the multi-fiber connector 260 so that only sixteen optical fibers are populated in the ferrule 261. The cable harness, in an alternate embodiment, can have up to four more fiber optic connectors attached at the first end 251 without having to replace the MTP connector 260 with a multi-fiber connector having an additional fiber count (or using two MTP connectors). In other embodiments, other multi-fiber connectors may be used to increase or decrease the amount of optical fibers in order to provide for different size cable harnesses depending on the number of ports 221 in the hardware blade component 200a to be populated. The cable harness 241 has the second end 252 which is furcated at furcation point 253 in order to provide the eight individual cables at the first end 251. Finally each individual cable is terminated with a connector 231-238. Each connector 231-238 may have a boot 255. Each boot 255 may be numbered 1-8 (see FIG. 6) in order to help the operator to keep the fanned-out first end 251 of the harness 241 organized. In another embodiment the CSS and blade is numbered sequentially 1 to XX depending on the number of ports for the intended blade, such as on a 48 port blade. The harness boots will be number 1 to 48 and the CSS will be numbered 1 to 24 on one side and 25 to 48 on the other side.

Figure 6:
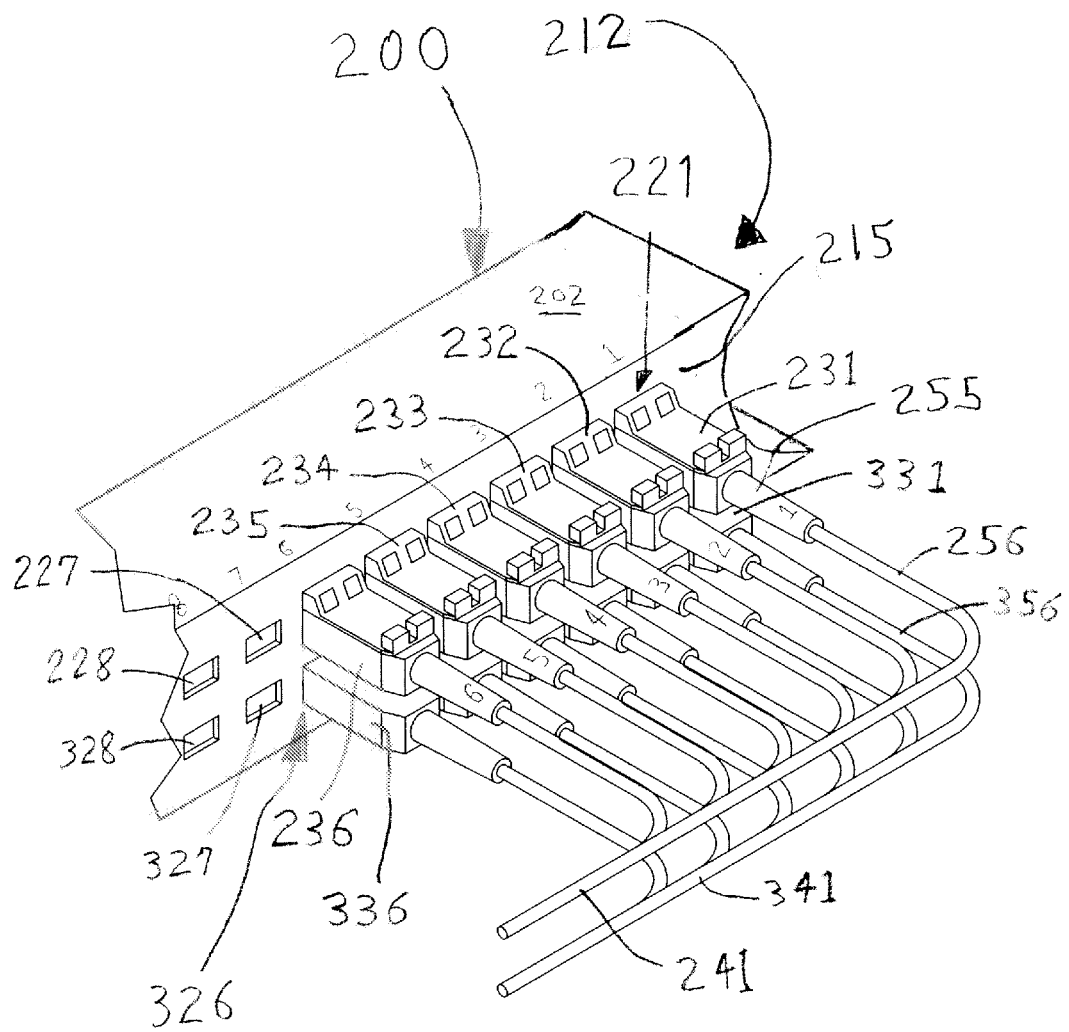
FIG. 6 is a perspective view of the cable harness of FIG. 5 shown mated to a component simulation shell of the present invention.
Figure 7:
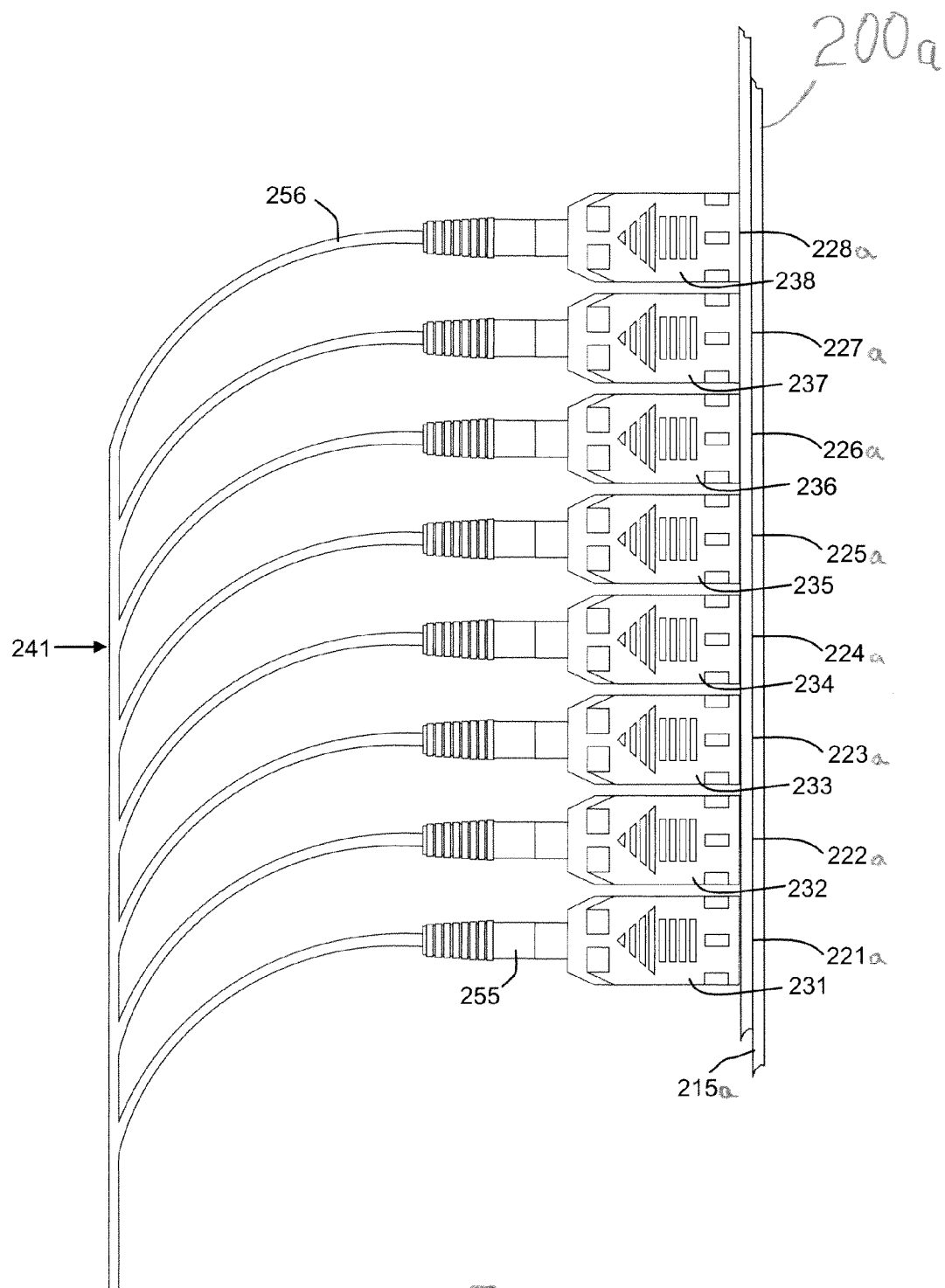
FIG. 7 is a plan view of the cable harness of FIG. 5 following removal from the component simulative shell and permanently mated to a blade or electronic component.

FIG. 6 depicts the first end 212 of the CSS 200. Depicted on the CSS are the connectors 231-236 mounted in the respective contact points or ports 221-226 of the CSS 200. Thus, it may be understood that the unpopulated ports depicted in FIG. 3 shown being populated in FIG. 6 (at the first end 212). With respect to FIG. 7, the connectors 231-238 are attached to the cable harness 241 (as depicted in FIG. 6). These connectors 231-238 have been sequentially moved from the CSS 200 (FIG. 6) in the corresponding port 221-226 to be connected to the electronic component 200a (FIGS. 7 and 8). So for example, port 221 from the CSS (FIGS. 3 and 6) corresponds to port 221a of the electronic component 200a (FIG. 7). Port 222 (FIGS. 3 and 6) corresponds to port 222a of the electronic component 200a (FIG. 7). And continuing up the length of the CSS, each port 223-228 corresponds to the receptacle openings 223a-228a of the electronic component 200a (FIG. 7), respectively.

The CSS 200 includes location indicia nos. "1-xx", or "00-xx" depicted on the side 202 as depicted in FIG. 6. Likewise, the electronic component includes corresponding indicia, so that the technician can easily match the connectors in a one-to-one sequence being moved from the CSS 200 to the electronic component 200a. For example, with respect to FIG. 6, the first connector 231 is mated in port 221 and the port is marked with indicia marking "1" (in some embodiments the blade port, boot and CSS may start with "00") on the top side 202. A corresponding indicia number "1" is placed on the boot 255 of the connector 231. So the technician will understand that connector 231 that is located in position number 1 on the CSS is removed from port 221 and carried over to the electronic component 200a and the connector 231 is inserted into location number 1 or in receptacle 221a of the electronic component 200a (FIG.

7-8). Likewise, the second connector 232 having indicia "2" on the boot and located in port 222 of the CSS is removed and located in position number "2" by mating in receptacle 222a on the electronic component 200a.

As depicted in FIG. 6, the first connector 231 will be mated to the CSS 200 in the first port 221 (see numeral "1" on the boot 255) and the second connector 232 is mated to second port (see numeral "2" on its boot). Each of the rest of the connectors 233-236 are mated to each corresponding part of the CSS 200. Ports 227 and 228 are visible in FIG. 6 because in the depicted embodiment the cable harness 241 has only six of the eight connectors installed. Prior to shipment an operator will complete the packing of the cable and mate connector 237 and 238 (FIG. 6) to ports 227 and 228, respectively. As shown in FIG. 6, following assembly of the first cable harness 241, a second identical cable harness 341 is mated to the CSS 215, so that each connector mates to a corresponding port of the CSS. For example, connector 336 of the second cable harness 341 is depicted being mated in port 326 and adjacent ports 327, 328 are yet to receive corresponding connectors.

As can be seen in FIG. 5, the first end 251 of each individual cable is progressively longer for each connector 231-238. For example, the individual cable at the first end 251 for the eighth connector 238 will be approximately about ½" longer than its adjacent connector 237 etc. It may be understood that the first end 251 of the individual cable to which the eighth connector 238 is terminated will be approximately 4" longer than the individual cable at the first end 251 to which the first connector 231 is terminated. Due to the custom assembly of these cable harnesses, a ¼" to 1" tolerance can be maintained. As will be discussed in more detail later, the staggering of the lengths of the first end 251 of the fanned-out cables on each cable harness 241, 341, 351, 361 (FIG. 8) and a narrow tolerance range allows for the orderly connection of the harness to each hardware blade component 215a (FIG. 7) and eliminates slack and provides for a neat and organized cabling system.

Turning to FIG. 8, the staggered lengths of each of the adjacent cables for the first cable harness 241 are shown mated to the hardware blade component 200a in an orderly fashion due to the orderliness of the cables when removed from the CSS 200. It may be understood that the first connector 231 has the cable 256 being shorter than the cable for the eighth connector 238, because the cable for connector 238 travels further along the length of the front end of the hardware blade component 200a, eight channels away (FIG. 7). The first cable harness 241 has its connectors 231-238 mated to the hardware blade component 200a at a first area 271a having eight ports 221a-228a. In an embodiment, the harness 241 may have more than eight connectors and the second area 243 (shown having vacant ports in FIG. 8) may be populated with additional connectors up to and going beyond port 233a. The second harness assembly 341 has its connectors mated to the hardware blade component 200a at a second area having 24 eight ports (13 depicted in FIG. 8); the third cable harness 351 has its twenty-four connectors (is depicted in FIG. 8) mounted to the hardware blade component 200a a third area having 24 ports and the fourth cable harness 361 has its twenty-four connectors (is depicted in FIG. 8) mated to the hardware blade component 200a at a fourth area having 24 ports provided. It may be understood in other embodiments, that the hardware blade component area 271a may have varying numbers of ports depending on the grouping of the number of connectors terminated on each cable harness 241, 341, 351, 361. For example, the host component 200a may have a 64, 48, 32-, 24-, 18, 12- or other port configuration. In addition, hardware blade component areas may be separated and located on the multiple hardware blade components.

To understand the invention further, the steps of removing the cables from the CSS 200 and mounting and routing the cables on the rack 1100 will be discussed in sequence with respect to FIG. 8. The first CSS 200 contains first cable harness 241 is removed from the container 100 and because each of the connectors 231-238 are fanned-out across the CSS 200 the first connector 231 may be removed from (port) 221 of the CSS and inserted in the first port 221 on the first hardware blade component 200a in first position. Each of the next connectors 232-238 are likewise removed from their corresponding ports 222-228 (FIG. 3) and mated to its corresponding port 222a-228a in the first area 271 on the hardware blade component 200a using a one to one matching sequence between each contact point (port) of the CSS 200 and the corresponding port of the component 200. Because each contact point 221-228, 321-328 (FIG. 3) includes markings or indicia such as numbering (see 1-8 numbering in FIG. 6) on the CSS 200 that correspond to the indicia, such as numbering on each boot 255 of each connector and the CSS 200 is a simulation of the component 200a, an operator using a serial mode of assembly can quickly and easily replicate the temporary mounting configuration of the connectors on the CSS 200 to a permanent mounting configuration on the component 200a when each connector is mated to its corresponding port and the cabling is arranged on the rack. The second end 252 of the cable harness 241 is routed to the left or right and up or down the first side of 1100 of the rack toward a patch panel, as further described in U.S. Pat. No. 8,391,663 incorporated herein by reference.

The second CSS and its cable harness 341 is then removed from its container and because the CSS arranges so that its first end is fanned-out, each of the connectors may be mated with the ports of second area 272 of the hardware blade component 200a. Likewise, the second end 252 of the second cable harness 242 is routed to the right to form a cable bundle 245 with the first harness 241. The third cable harness 351 is removed from its container while attached to its CSS and the cables removed sequentially from the CSS and organized so that the twenty-four connectors at its first end may be sequentially mated to a third hardware blade component 200b. The second end of the third cable harness 351 is routed to the right or left to form a cable bundle 245 with the first and second harnesses 241, 341 at first side of the rack 1100.

A fourth cable harness 361 is removed from its container while mated to its CSS and each connector removed sequentially and attached to the second blade component 200b, as discussed above for cable harnesses 241, 341 and 351. In the embodiment depicted in FIG. 8, the cable harness bundle 245 is secured using hook and loop straps 401. The cable harness bundles 241, 341, 351, 361 will have a total length between 45" and 90". The length of the cable harness may vary depending on the specific hardware component and port configuration.

Each of the second, third and fourth cable bundles 241, 341, 351, 361 are formed in the same manner as discussed above. In other words, in the embodiment depicted in FIG. 8 each cable harness 241, 341, 351, 361 may be quickly and easily attached to the hardware blade component, 1200a, 1200b. So in the embodiment depicted in FIG. 8 each connector is mated to the electronic component in the same order and sequence from which the connectors of the cable harness 241, 341, 351, 361 were temporarily mounted to the contact points of each CSS for each cable harness.

While various concepts have been described in detail, it would be appreciated by those skilled in the art that various modifications and alternatives to those concepts could be developed in light of the overall teachings of this disclosure.

Therefore, a person skilled in the art, applying ordinary skill, will be able to practice the invention set forth in the claims without undue experimentation. It will additionally be appreciated that the particular concepts exposed here are meant to be illustrative only and not limiting to the scope of the invention, which is to be given the full breach of the appended claims and any equivalence thereof.

What is claimed:

1. A component simulation shell comprising:
a shell having four sides including a front side and the front side having contact points arranged to simulate a host component when the component simulation shell is remote from the host component wherein the number of contact points and spacing between contact points on the front side of the shell simulate the number and spacing of receptacles located on the host component so that the shell is capable of being temporarily populated with accessories and the accessories capable of being serially removed and serially attached to the receptacles of the host component wherein the accessories comprise a cable harnesses including furcated end portions each having fiber optic connectors capable of being temporarily mounted to the contact points of the shell and the connectors removable from the contact points capable of mating with the host component.

2. The component simulation shell of claim 1 wherein the shell includes a hook for suspending the shell from a rack adjacent the host component.

3. The component simulation shell of claim 1 wherein the shell is made of paper material including one of cardboard, paperboard and paper-composite material.

4. The component simulation shell of claim 1 wherein the shell is arranged within an assembly that provides for a retention area adjacent the shell for temporarily storing the accessory.

5. The component simulation shell of claim 1 wherein the contact points are rectangular apertures punched-in the front side of the shell and each aperture having a profile that is similarly sized to an outer profile of the connector so that the aperture provides a friction fit to maintain the connector within the aperture and attached to the shell.

6. The component simulation shell of claim 1, wherein the number of contact points provided by the shell is equal to or greater than the number of receptacles of the host component including one of a 12-, 16-, 18-, 24-, 32-, 48-, or 64 port format.

7. A shipping container assembly comprising:
a housing forming a retention area;
a component simulation shell disposed within the housing and the component simulation shell having contact points arranged to simulate a host component; and
an accessory disposed in the retention area and connected to the contact points of the component simulation shell in a manner that simulates the arrangement of the accessory when connected to the host component that is simulated by the component simulation shell wherein the accessory is a cable harness having connectors attached at ends of the cable and the connectors being connected to the contact points of the component simulation shell.

8. The container assembly of claim 7 wherein the contact points of the host component comprises plurality of apertures that simulate fiber optic receptacles of an electronic component.

9. The container assembly of claim 8 wherein the electronic component is a horizontally or vertically oriented blade mounted in a rack and the component simulation shell may be removed from the container and located adjacent the rack and serially removing the connectors from the component simulation shell and attaching the connectors to the receptacles of the blade in a serial fashion.

10. The container assembly of claim 7 further comprising a first retention area and a second retention area and a cable harness having a first end portion and a second end portion and the first end portion substantially residing in the first retention area and the second end portion substantially residing in the second retention area.

11. The container assembly of claim 10 wherein the first retention area comprises a front portion of the container adjacent the contact points on the component simulation shell and the second retention area comprises a back portion of the container behind the CSS component simulation shell.

12. The container assembly of claim 11 wherein the component simulation shell includes a cable feature capable of receiving a cable harness there through so that a continuous strand of the cable harness may extend from the first retention area through the cable feature and into the second retention area.

13. The container assembly of claim 10 wherein the first end portion of the cable harness is furcated and includes a LC type Pro-slider fiber optic connector.

14. The container assembly of portion claim 11 wherein the second end of the cable harness includes a fiber optic connector having a multi-fiber ferrule including one of an MT style and MTP connector.

* * * * *